US011303876B2

(12) United States Patent
Rajak et al.

(10) Patent No.: US 11,303,876 B2
(45) Date of Patent: Apr. 12, 2022

(54) TEMPERATURE COMPENSATION FOR IMAGE ACQUISITION AND PROCESSING APPARATUS AND METHODS

(71) Applicant: SYMBOL TECHNOLOGIES, LLC, Lincolnshire, IL (US)

(72) Inventors: Aleksandar Rajak, Ottawa (CA); Parimal R. Patel, Holbrook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 16/510,627

(22) Filed: Jul. 12, 2019

(65) Prior Publication Data

US 2019/0342539 A1   Nov. 7, 2019

Related U.S. Application Data

(63) Continuation of application No. 15/660,528, filed on Jul. 26, 2017.

(51) Int. Cl.
*H04N 13/246* (2018.01)
*G01B 11/00* (2006.01)
(Continued)

(52) U.S. Cl.
CPC ........... *H04N 13/246* (2018.05); *G01B 11/00* (2013.01); *G01B 11/02* (2013.01); *G01B 21/042* (2013.01); *G01K 1/14* (2013.01); *G06T 7/62* (2017.01); *H04N 13/178* (2018.05); *H04N 13/239* (2018.05); *G06T 2207/10012* (2013.01); *G06T 2207/10021* (2013.01)

(58) Field of Classification Search
CPC ............. G06K 7/10722; G06K 7/1417; G06K 7/1447; G06K 7/1443; G06K 7/10792; G06K 19/06037; H04N 5/33
See application file for complete search history.

(56) References Cited

U.S. PATENT DOCUMENTS

| 6,113,547 A | 9/2000 | Catallo et al. |
| 9,007,490 B1 * | 4/2015 | Yuan ...................... G06F 3/017 |
| | | 348/222.1 |

(Continued)

OTHER PUBLICATIONS

International Search Report and Written Opinion for International Application No. PCT/US2018/039795 dated Sep. 27, 2018.

*Primary Examiner* — Neil R Mikeska (57) ABSTRACT

A data capture device includes: an imaging module including an image sensor and a lens; a temperature sensor associated with the imaging module; a memory storing, for a plurality of temperatures, respective imaging module response parameters corresponding to the temperatures; an imaging controller connected to the image sensor and the temperature sensor; the imaging controller including a frame generator configured to: receive (i) image data from the image sensor and (ii) a temperature measurement from the temperature sensor; generate a raw image frame containing the temperature measurement and the image data; and provide the raw image frame to a calibrator for generation of a calibrated image frame based on the raw image frame and one of the imaging module response parameters corresponding to the temperature matching the temperature measurement.

14 Claims, 4 Drawing Sheets

(51) Int. Cl.
*G01B 21/04* (2006.01)
*H04N 13/239* (2018.01)
*G06T 7/62* (2017.01)
*H04N 13/178* (2018.01)
*G01B 11/02* (2006.01)
*G01K 1/14* (2021.01)

(56) References Cited

U.S. PATENT DOCUMENTS

| | | | |
|---|---|---|---|
| 9,031,343 B2* | 5/2015 | Venkataraman | G06T 9/00 |
| | | | 382/250 |
| 9,307,148 B1* | 4/2016 | Baldwin | H04N 5/23267 |
| 9,681,111 B1* | 6/2017 | Newman | H04N 9/8205 |
| 9,922,387 B1* | 3/2018 | Newman | G06F 17/3028 |
| 2003/0202089 A1* | 10/2003 | Alhadef | G01C 11/06 |
| | | | 348/42 |
| 2006/0103742 A1* | 5/2006 | Kubo | H04N 5/2178 |
| | | | 348/241 |
| 2008/0094490 A1* | 4/2008 | Compton | H04N 5/361 |
| | | | 348/243 |
| 2008/0237466 A1 | 10/2008 | Key | |
| 2009/0009617 A1* | 1/2009 | Ito | H04N 5/23245 |
| | | | 348/222.1 |
| 2009/0152664 A1* | 6/2009 | Klem | H01L 27/14603 |
| | | | 257/440 |
| 2010/0128140 A1* | 5/2010 | Iijima | H04N 5/2254 |
| | | | 348/222.1 |
| 2010/0195904 A1* | 8/2010 | Tsuruoka | A61B 1/05 |
| | | | 382/165 |
| 2010/0265332 A1 | 10/2010 | George-Svahn et al. | |
| 2011/0216215 A1* | 9/2011 | Maruyama | G06T 7/80 |
| | | | 348/222.1 |
| 2011/0298933 A1 | 12/2011 | Yanowitz et al. | |
| 2012/0257065 A1* | 10/2012 | Velarde | H04N 5/2258 |
| | | | 348/175 |
| 2013/0235163 A1* | 9/2013 | Joo | H04N 13/239 |
| | | | 348/47 |
| 2013/0298101 A1 | 11/2013 | Chandra | |
| 2013/0322753 A1* | 12/2013 | Lim | G06T 5/001 |
| | | | 382/167 |
| 2014/0049635 A1 | 2/2014 | Laffargue et al. | |
| 2015/0055821 A1* | 2/2015 | Fotland | G06K 9/3241 |
| | | | 382/103 |
| 2017/0016714 A1 | 1/2017 | Laffargue et al. | |
| 2017/0197315 A1* | 7/2017 | Haegermarck | B25J 9/1692 |
| 2017/0300734 A1* | 10/2017 | Zheng | G06K 7/10722 |

* cited by examiner

TEMPERATURE COMPENSATION FOR IMAGE ACQUISITION AND PROCESSING APPARATUS AND METHODS

BACKGROUND

Data capture devices, such as mobile imaging devices, may be deployed in a wide variety of environments and applications. The ambient conditions in which such imaging devices are required to operate vary between environments, as well as over time within each environment. For example, an imaging device deployed to capture images of objects in a warehouse environment may be required to operate over a range of ambient temperatures. Variations in ambient conditions may lead to variations in the quality of image data captured by the devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a data capture device, comprising: an imaging module including an image sensor and a lens; a temperature sensor associated with the imaging module; a memory storing, for a plurality of temperatures, respective imaging module response parameters corresponding to the temperatures; an imaging controller connected to the image sensor and the temperature sensor; the imaging controller including a frame generator configured to: receive (i) image data from the image sensor and (ii) a temperature measurement from the temperature sensor; generate a raw image frame containing the temperature measurement and the image data; and provide the raw image frame to a calibrator configured to generate a calibrated image frame based on the raw image frame and one of the imaging module response parameters corresponding to the temperature matching the temperature measurement.

Figure 1:
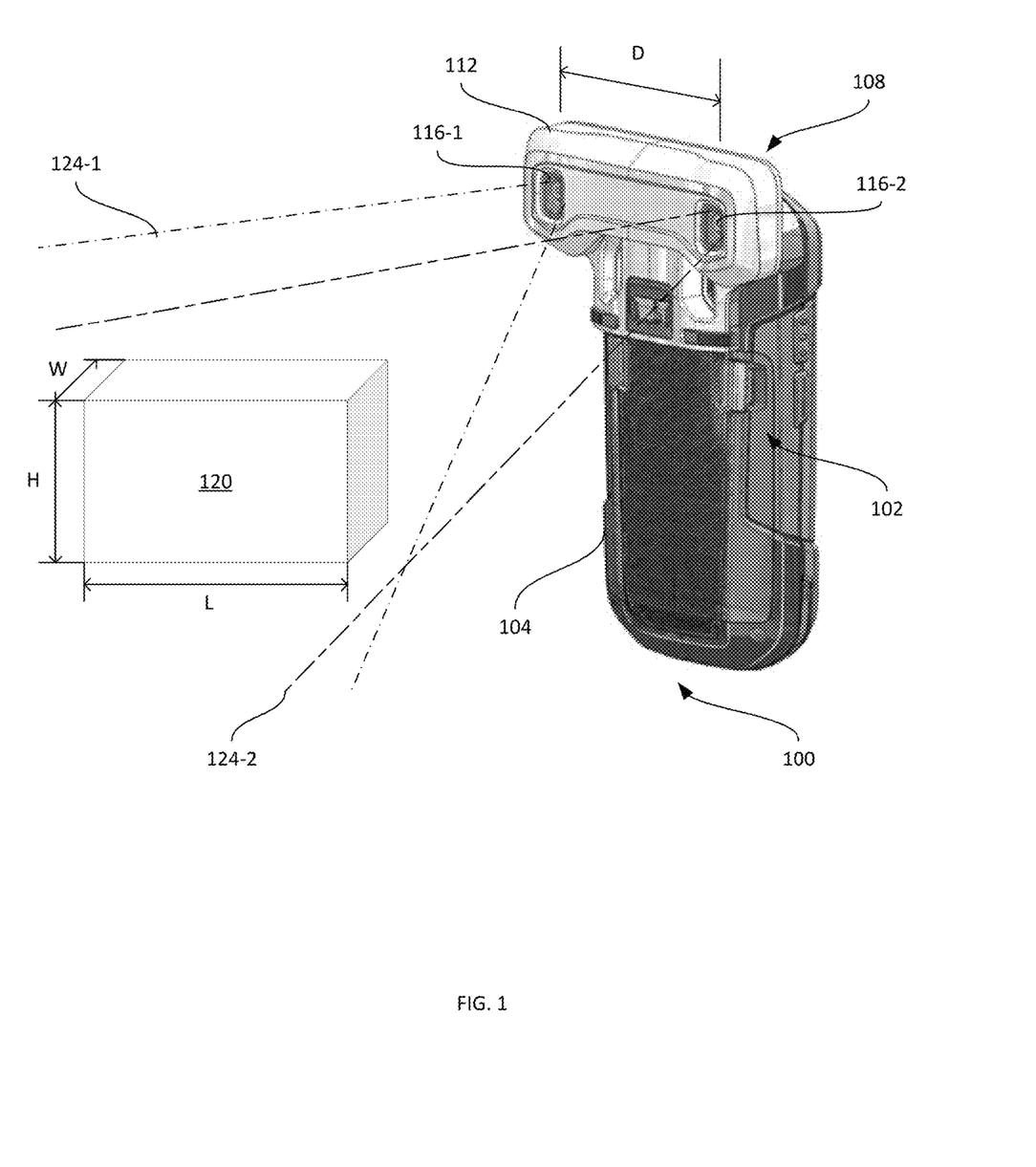
FIG. 1 depicts a data capture device.

FIG. 1 depicts an example data capture device 100 in accordance with the teachings of this disclosure. The device 100, such as a mobile communications device or a mobile computer having data capture hardware including a scanner, includes a housing 104 supporting the various other components discussed herein. In some examples, the housing 104 is a unitary structure supporting all other components of the device 100. In other examples, the housing 104 is implemented as two or more distinct (e.g. separable) housing components, such as a first component comprising a pistol-grip handle including a cradle configured to receive a second component comprising the housing of a smartphone, tablet computer, or the like. In an alternate embodiment, the data capture device of FIG. 1 is a non-mobile device having a scanner and an imaging module 108 (described below), where the imaging module 108 may be either removably connected to or form part of the data capture device.

The housing 104 of the mobile data capture device 100, in the present example of FIG. 1, contains a handheld module 102 and also supports an imaging module 108 configured to capture one or more images of objects within a field of view of one or more imaging assemblies of the imaging module 108. In the illustrated example, the imaging module 108 is a removable component of the device 100 having an imaging module housing 112 configured to releasably couple the module 108 to the housing 104, and to establish data communications between internal components of the imaging module 108 and the handheld module 102. In other examples, the imaging module 108 is an integral component of the device 100, and the housing 112 is accordingly defined as a portion of the housing 104. The device 100 also includes, in some examples, one or more additional imaging modules and/or laser-based scanners (not shown), for example configured to capture and interpret indicia such as barcodes on objects within the fields of view of such additional modules.

In the present example, the imaging module 108 implements external object dimensioning functionality, and may therefore also be referred to herein as the dimensioning module 108. In particular, the imaging module 108 includes stereoscopic imaging assemblies, in the form of a first imaging assembly 116-1 and a second imaging assembly 116-2. Each imaging assembly 116 includes at least an imaging sensor, such as a charge-coupled device (CCD) or a complementary metal-oxide-semiconductor (CMOS). Each imaging assembly 116 also includes a lens, or a set of lenses, for focusing light onto the above-mentioned image sensor. The imaging assemblies 116 can also include any one or more of light emitters, reflectors and the like enabling the dimensioning module 108 to capture stereoscopic images of an object 120 in the respective fields of view 124-1 and 124-2 of the imaging assemblies 116.

The dimensioning module 108 is configured, responsive to capturing stereoscopic images of the object 120 (e.g., a pair of images captured by the imaging assemblies 116 substantially simultaneously), to determine dimensions of the object 120. For example, based on a comparison of the images in the stereoscopic pair, the dimensioning module 108 is configured to determine one or more of the length "L", the width "W" and the height "H" of the object 120. The determination of the above-mentioned dimensions is based, at least in part, on a separation distance "D" between the imaging assemblies 116 (more specifically, between the image sensors of the imaging assemblies 116), which is maintained by the housing 112 of the dimensioning module 108. The distance D is stored in an imaging controller, discussed in greater detail below, and is employed in the determination of object dimensions.

As discussed below in greater detail, the dimensioning module 108 is also configured to obtain temperature measurements associated with one or more of the imaging assemblies 116. The dimensioning module 108 is further configured to one or more of image capture, image calibration, and dimension determination based on the temperature measurements. Before describing the functionality of the dimensioning module 108 in greater detail, certain internal components of the device 100, and particularly the dimensioning module 108, will be discussed with reference to FIG. 2.

Figure 2:
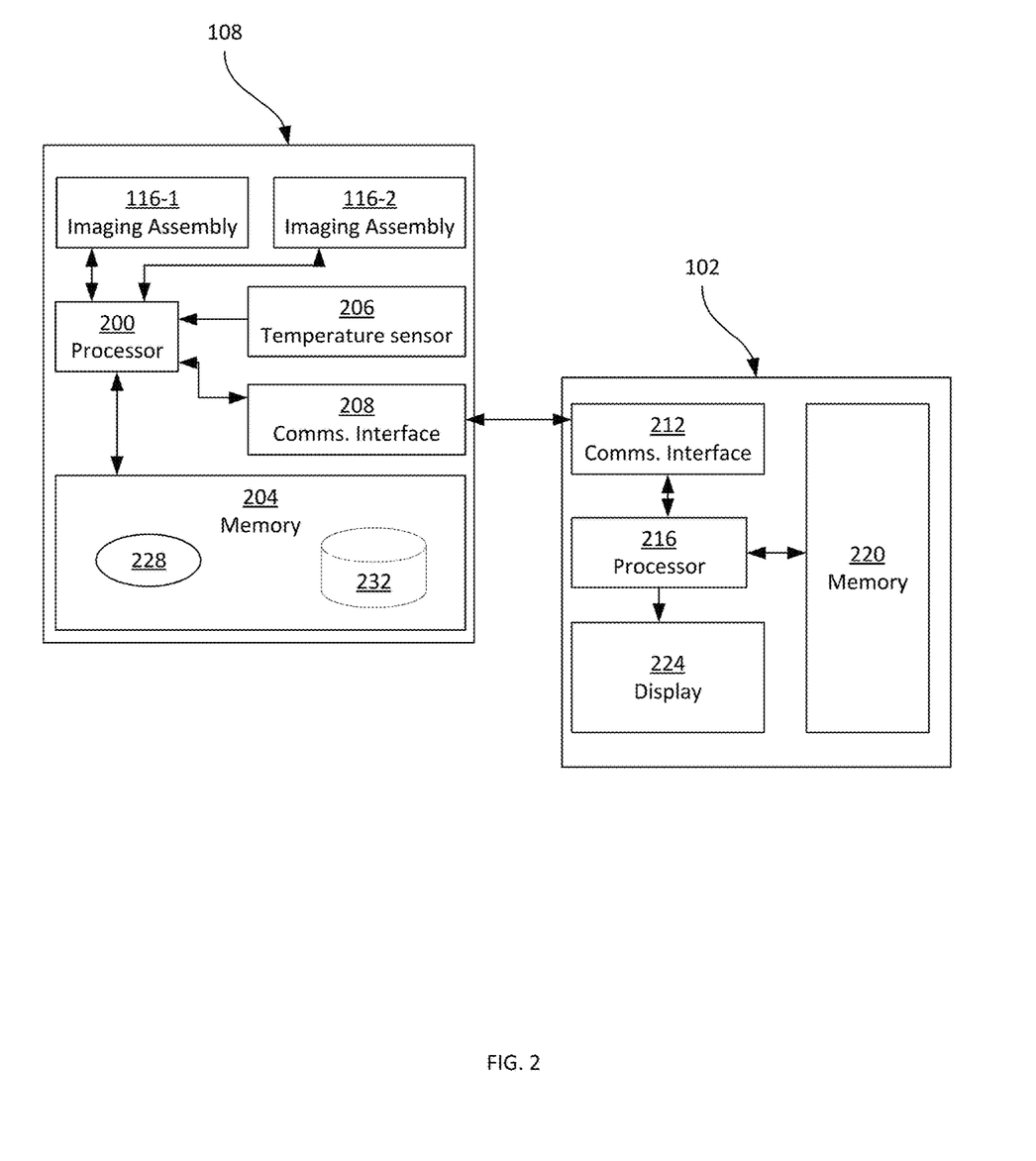
FIG. 2 is a block diagram of certain internal hardware components of the data capture device of FIG. 1.

Referring to FIG. 2, a schematic diagram of certain internal components of the device 100 is shown. The dimensioning module 108 includes an imaging and dimensioning processor 200, which is implemented as one or more central processing units (CPUs), one or more graphics processing units (GPUs), or a combination thereof. The processor 200 is interconnected with a non-transitory computer readable storage medium, such as a memory 204. The memory 204 includes any suitable combination of volatile (e.g. Random Access Memory ("RAM")) and non-volatile (e.g. read only memory ("ROM"), Electrically Erasable Programmable Read Only Memory ("EEPROM"), flash memory) memory. In general, the processor 200 and the memory 204 each comprise one or more integrated circuits, which may include a configuration specifically optimized for dimensioning processing described herein.

The dimensioning module 108 also includes, as noted earlier, the first and second imaging assemblies 116-1 and 116-2, each of which includes at least an image sensor and a lens. The imaging assemblies 116 are connected, e.g. via one or more communication buses, to the processor 200. Further, each imaging assembly 116 is controllable by the processor 200 to capture image data and provide the image data to the processor 200. The dimensioning module 108 also includes at least one temperature sensor 206 associated with at least one of the imaging assemblies 116. The temperature sensor 206 is physically adjacent to at least one of the imaging assemblies 116 in some examples. In further examples, each imaging assembly 116 includes a temperature sensor 206 configured to measure (and report to the processor 200) the temperature within or adjacent to the respective imaging assembly 116. In some examples, the temperature sensor 206 is an integral component of an image sensor of one or both of the imaging assemblies 116 or of circuitry coupled to the respective image sensor(s). As separation D between imaging assemblies 116-1 and 116-2 is increased and depending upon sensitivity of the temperature sensor, for example, embodiments of the present disclosure may include a temperature sensor dedicated to each imaging assembly 116 to further increase accuracy.

The dimensioning module 108 also includes a communications interface 208, enabling the dimensioning module 108 to exchange data with the handheld module 102. The handheld module 102, accordingly, also includes a communications interface 212. The communications interfaces 208 and 212 each include any suitable hardware (e.g. transmitters, receivers, network interface controllers and the like) allowing the intercommunication between the dimensioning module 108 and the handheld module 102. In the present example, the interfaces 208 and 212 are Universal Serial Bus (USB) interfaces.

The handheld module 102 also includes a processor 216 (e.g. a suitable combination of CPUs and/or GPUs) interconnected with the communications interface 212 and a memory 220 (e.g., a suitable combination of volatile and non-volatile memory elements). The processor 216 is also connected with a display 224 of the handheld module 102, which may include a touch screen input device (not shown).

Returning to the dimensioning module 108, the memory 204 stores a plurality of applications, each including a plurality of computer readable instructions executable by the processor 200. The execution of the above-mentioned instructions by the processor 200 causes the dimensioning module 108 to implement certain functionality, as discussed herein. The applications are therefore said to be configured to perform that functionality in the discussion below. Further, in some examples, some or all of the functionality implemented via the execution of the applications in the memory 204 by the processor 200 is implemented by way of one or more special-purpose hardware elements, such as Field Programmable Gate Arrays (FPGA) and/or Application-Specific Integrated Circuits (ASICs). More generally, the processor 200 as configured by execution of the applications stored in the memory 204, and the above-mentioned special-purpose hardware elements, may also be referred to herein as an imaging controller.

In the present example, the memory 204 stores an image processing application 228. The dimensioning module 108 is configured, via execution of the image processor application 228 by the imaging controller 200, to capture image data, pre-process the image data, and determine dimensions for objects depicted in the image data. The memory 204 also stores a set of imaging module response parameters 232 employed by the application 228 in the performance of the above-mentioned functions.

The imaging module response parameters 232, having respective values, are a set of parameters defining various behavioral attributes of the imaging assemblies 116 at different ambient temperatures. The characteristics of image sensors, lenses, and other components of the imaging assemblies 116 may vary with ambient temperature. For example, at elevated temperatures (e.g., 70 degrees C.), the lenses may suffer from greater physical distortion than at lower temperatures (e.g., 25 degrees C.). As a further example, the achievable contrast ratio (i.e. dynamic range) of the image sensors of the assemblies 116 may be reduced at elevated temperatures. As a further example, the image sensors may generate a greater degree of noise in the captured image data at elevated temperatures. In general, the imaging module response parameters 232 include a plurality of imaging assembly behavioral attributes, and for each attribute, a plurality of temperature-specific values. An example of the parameters 232 is shown below in Table 1.

TABLE 1

Example Imaging Module Response Parameters 232

| Temperature (deg. Celcius) | Sharpness | Contrast Ratio | Signal-to-Noise | Vignetting | Dimension Error |
|---|---|---|---|---|---|
| −20 to 0 | value 1 | value 6 | value 11 | value 16 | value 21 |
| 1 to 20 | value 2 | value 7 | value 12 | value 17 | value 22 |
| 21 to 40 | value 3 | value 8 | value 13 | value 18 | value 23 |
| 41 to 60 | value 4 | value 9 | value 14 | value 19 | value 24 |
| 61 to 80 | value 5 | value 10 | value 15 | value 20 | value 25 |

As seen in Table 1, values defining each of a plurality of behaviors of the imaging assemblies 116 for each of a plurality of temperature ranges are contained in the parameters 232. In particular, for each temperature range, the parameters 232 define the maximum sharpness that the image sensors can achieve. The parameters 232 also define the maximum contrast ratio that the image sensors can achieve, as well as the maximum signal-to-noise ratio that the image sensors can achieve. Further, the parameters 232 define the degree of vignetting imposed by the lenses of the assemblies 116 at each temperature range. Still further, the parameters 232 define a dimensioning error for each temperature range, which may be expressed as a percentage of the distance D shown in FIG. 1, and which results from thermally-induced expansion or contraction of the housing 112.

Other behavioral attributes of the image sensors, lenses, or other components of the imaging assemblies 116 can also be represented in the parameters 232. In some examples, the gain (analog, digital, or both) attainable by the image sensors for each temperature range is included in the parameters 232. In further examples, other forms of lens distortion beyond vignetting (e.g., barrel distortion) are represented in the parameters 232.

The total temperature range (−20 to 80 degrees C. in the present example) encompassed by the parameters 232 can be varied in other examples. In addition, the size of the temperature intervals can also be varied from the twenty degrees shown in Table 1. The parameters 232 can be obtained, for example, by empirical measurement of sensor behavior. For example, each of the above-mentioned parameters can be measured at a plurality of temperatures; preferably such measurements are collected from a plurality of imaging assemblies 116, and the resulting mean values for each parameter and each temperature interval are stored in the parameters 232. In other examples, minimum and maximum values for at least one of the behavioral attributes may be stored in the parameters 232, rather than the above-mentioned mean values.

Figure 3:
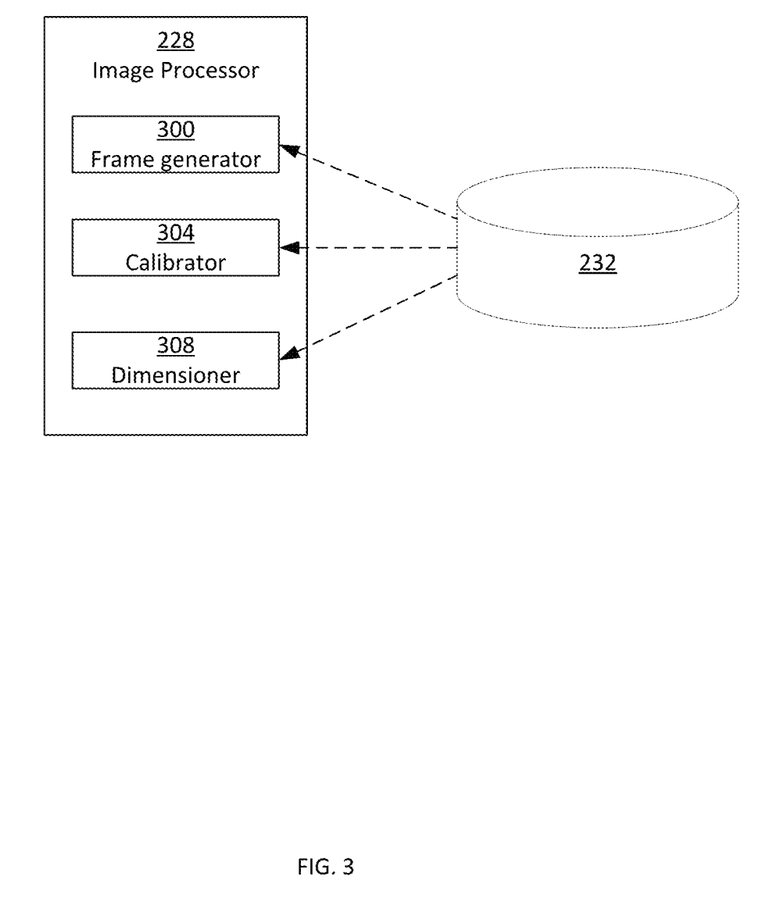
FIG. 3 is a block diagram of certain internal components of the data capture device of FIG. 1.

Turning to FIG. 3, certain components of the image processor application 228 are illustrated. As will be apparent to those skilled in the art, any one of, or any combination of, the components illustrated in FIG. 3 can be implemented as dedicated hardware elements in other examples (e.g. FPGAs, ASICs, and the like). The image processor application 228 includes a frame generator 300 configured to control the imaging assemblies 116 to capture image data (e.g., depicting the object 120 within the fields of view 124-1 and 124-2 as shown in FIG. 1). In one embodiment, the image processor application 228, including its various components discussed herein, such as the frame generator 300, the calibrator 304 and the dimensioner 308, is specifically configured as a hardware circuit or a firmware component of the imaging controller 200 or as a standalone image processor, such as when the image processor application 228 is an FPGA or an ASIC circuit. The frame generator 300 is configured to receive at least one temperature measurement from the temperature sensor, and to generate a raw image frame incorporating the temperature measurement, as will be discussed below. In the present example, the frame generator 300 is configured to control the imaging assemblies 116 to acquire image data substantially simultaneously, and to generate a pair of raw image frames, each containing image data captured by a respective one of the imaging assemblies 116. The frame generator 300 can also, in some examples, be configured to retrieve the imaging module response parameters 232 for use in the selection of capture parameters, for embedding in captured image data, and the like.

The image processor application 228 also includes a calibrator 304, configured to receive raw image frames from the frame generator 304, and to apply one or more adjustments to the raw image frames. The adjustments applied by the calibrator 304 are selected, in some examples, to generate calibrated image frames meeting preconfigured target attributes, such as contrast ratios, brightness levels, and the like. The calibrator 304 is therefore configured to assess the raw image frames and to apply any one or more of color channel level adjustments, sharpening operations, brightness adjustments, and the like to generate calibrated image frames. As will be discussed below, the calibrator 304 is configured to select the above-mentioned operations for application to the raw image frames based on the temperature measurements obtained by the frame generator 300 and based on the imaging module response parameters 232.

The image processor application 228 further includes, in the illustrated example, a dimensioner 308. The dimensioner 308 is configured to receive sets of calibrated image frames (e.g. pairs of image frames, corresponding to image data captured by the imaging assemblies 116-1 and 116-2) and determine the dimensions of one or more objects depicted in the calibrated image frames (e.g., the height, width and length mentioned earlier). As will be discussed below, the dimensioner 308 is also configured in some examples to retrieve the imaging module response parameters 232 and determine the dimensions, or apply restrictions to the determination of dimensions, based at least in part on the parameters 232.

Figure 4:
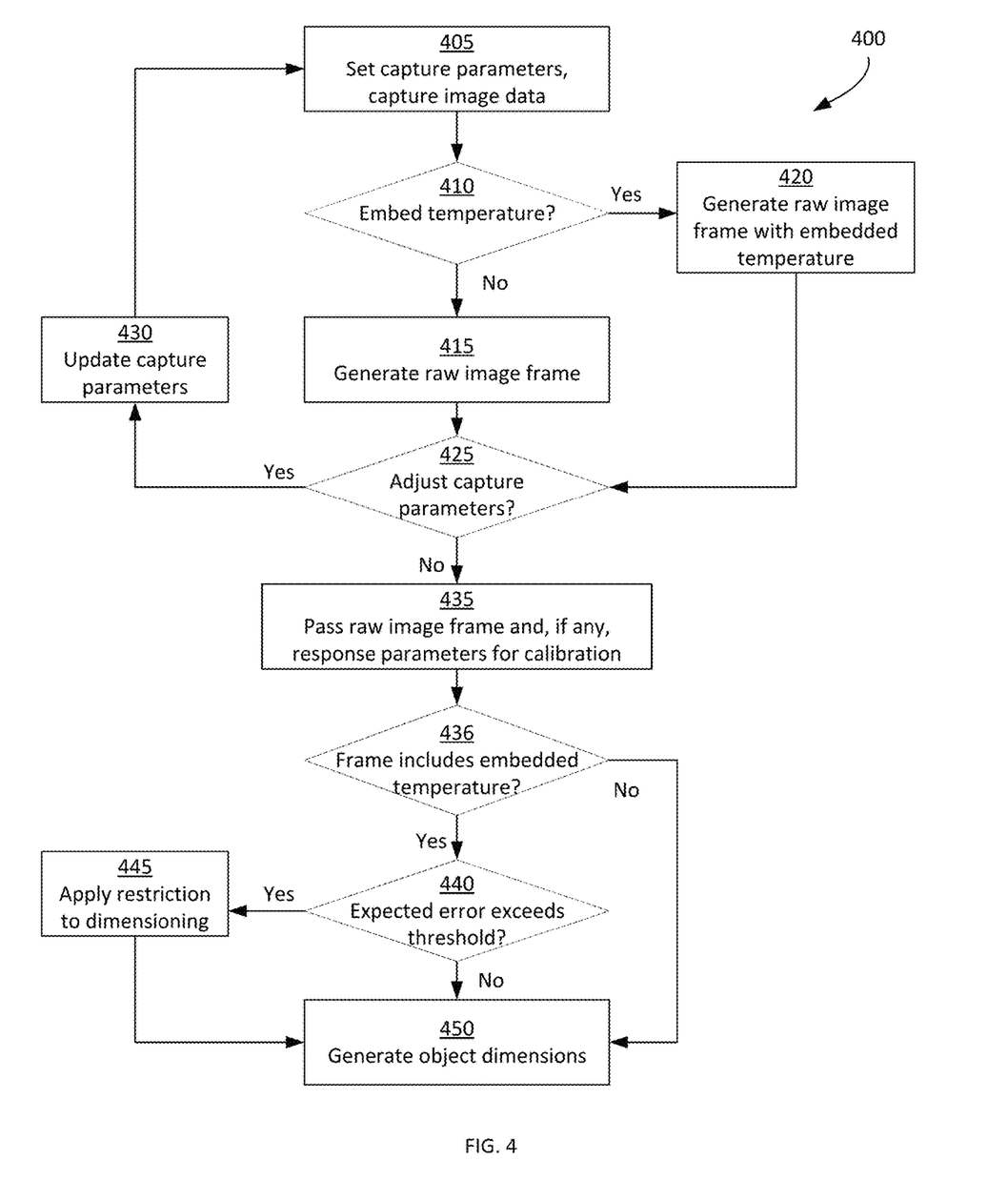
FIG. 4 is a flowchart of a method of temperature compensation for image capture and processing.

Turning to FIG. 4, a method 400 of temperature compensation for image acquisition and processing is illustrated. The method 400 will be described in conjunction with its performance on the device 100, and particularly by the dimensioning module 108.

At block 405, the dimensioning module 108 is configured to set capture parameters and control the imaging assemblies 116 to capture image data. In particular, the frame generator 300 is configured to control the imaging assemblies 116 to each capture image data according to a set of capture parameters, such as a frame rate, a resolution, and the like. The performance of block 405 may be initiated, for example, via the receipt of an image capture request, such as a dimensioning request received at the processor 200. The request may be generated by the handheld module 102, for example via the depression of a trigger (not shown) on the handheld module 102, or the selection of a selectable element presented on the display 224.

At block 410, the frame generator 300 is configured to determine whether to embed a temperature measurement in the image data generated by one or both of the imaging assemblies 116 responsive to block 405. The determination at block 410 may be based on a preconfigured frame counter maintained by the frame generator 300. For example, the frame generator 300 can be configured to embed a temperature measurement in the image data captured at block 405 once for every n number of captured frames (e.g., every fifth captured frame). In other examples, the frame generator 300 can be configured to embed a temperature measurement in the image data captured at block 405 once every five seconds, or in accordance with another time period. As will be apparent, other frame intervals or time periods may be employed at block 410. The frame interval or time period may, for example, be determined by the frame generator 300 based on the sample rate of the temperature sensor 206, which is typically lower than the frame rate of the imaging assemblies 116.

When the determination at block 410 is negative, the performance of the method 400 proceeds to block 415, at which a raw image frame is generated containing the image data from the imaging assembly. Thus, in the present example, two raw image frames are generated at block 415, containing the image data captured substantially simultaneously by the imaging assemblies 116-1 and 116-2 at block 405. However, when the determination is affirmative at block 410, the performance of the method 400 proceeds to block 420. In further examples, the determination at block 410 is omitted, and the frame generator 300 is instead configured to proceed directly to block 420 following every instance of image data capture initiated at block 405.

At block 420, the frame generator 300 is configured to generate a raw image frame containing a temperature measurement obtained from the temperature sensor 206. For example, the frame generator 300 is configured to receive, substantially simultaneously with the receipt of captured image data from the imaging assemblies 116 at block 405, a temperature measurement from the temperature sensor 206. When a plurality of temperature sensors are provided in the dimensioning module 108 (e.g., one temperature sensor 206 per imaging assembly 116), the frame generator 300 is configured to receive a temperature measurement from each such temperature sensor. Having received the temperature measurement, the frame generator 300 is configured to generate a raw image frame corresponding to each imaging assembly 116 and containing the above-mentioned temperature measurements. The frame generator 300, in other examples, is configured to embed an average temperature obtained from the plurality of temperature sensors in each raw image frame. The temperature measurements may be embedded, for example, in a header field of each raw image frame. In some examples, the values of parameters 232 corresponding to the temperature interval (e.g., the interval shown in Table 1) matching the temperature measurement obtained at block 420 may also be embedded in the raw image frame.

The frame generator 300, following the performance of block 415 or block 420, is configured to determine at block 425 whether to adjust capture parameters for subsequent performances of block 405. The determination at block 425 is based on existence and values of the temperature measurement embedded in the raw image frames. For example, the frame generator 300 can store one or more temperature thresholds for comparison with the temperature obtained at block 420. For frames without embedded temperature (e.g., frames generated in block 415), capture parameters are not adjusted.

When the determination at block 425 is affirmative, the frame generator 300 is configured to proceed to block 430 and update capture parameters for subsequent acquisition of image data at block 405. For example, the frame generator 300 can store, in association with each temperature threshold, capture parameter adjustments, such as adjustments specifying a reduction in the capture frame rate, resolution, or both, when the temperature exceeds the threshold (e.g., 50 degrees C.). Such reductions may reduce the power consumed by the imaging assemblies 116, and may therefore reduce the temperature of the image assemblies 116. Other capture parameters that may be adjusted at block 430 include analog and/or digital gain applied to the signal from the image sensors, exposure time, and the like.

When the determination at block 425 is negative (i.e., when the temperature measurement embedded at block 420 does not exceed the threshold evaluated at block 425), at block 435 the frame generator 300 is configured to provide the raw image frame, with the temperature embedded therein, to the calibrator 304 for calibration of the raw image frame. At block 435, the frame generator 300 is also configured to retrieve a subset of the imaging module response parameters 232 corresponding to the temperature measurement embedded in the raw image frame and pass the retrieved subset of the parameters 232 to the calibrator 304 for use during calibration. The retrieved subset of the parameters 232 may be passed to the calibrator 304 along with the raw image frame at block 435. The frame generator 300 can be configured to pass the retrieved imaging module responses parameters by embedding the retrieved parameters within the raw image frame itself. The retrieved subset of the parameters 232 can also be passed by the frame generator 300 in a distinct message accompanying the raw image frame. In further examples, the frame generator 300 is configured to initially pass only the raw image frame to the calibrator 304. The frame generator 300 is then configured to pass the above-mentioned subset of the parameters 232 to the calibrator in response to a request for such parameters from the calibrator 304. For frames without embedded temperature (e.g., frames generated in block 415), raw image frames without the response parameters 232 are passed to the calibrator in block 435, in which case, at block 436, the method proceeds directly to block 450 to generate object dimensions from the image frames output by the calibrator 304.

For frames with embedded temperature, following transmission of the raw image frame and the above-mentioned subset of the parameters 232 by the frame generator 300 to the calibrator 304 at block 435, the calibrator 304 is configured, based at least in part on the retrieved subset of the parameters 232, to generate a calibrated image frame from the raw image frame. As noted above, the calibrator 304 is configured to select and apply any of a variety of operations to the raw image frame, for example to adjust various properties of the raw image frame to comply with requirements of downstream applications, such as the dimensioner 308. For example, the calibrator 304 may be configured to adjust any one or more of the white balance, exposure, contrast, brightness and the like of the raw image frame. The calibrator 304 may base the selection of which operations to apply on the subset of the parameters 232 passed by the frame generator at block 435, and may also alter the application of those operations based on the subset of the parameters 232 passed by the frame generator at block 435.

The calibrator 304 is further configured, following generation of the calibrated image frame, to provide the calibrated image frame to the dimensioner 308. At block 436, for frames with embedded temperature, the calibrated image frame contains the temperature measurement embedded at block 420 (i.e. the calibrator 304 retains the embedded temperature measurement during the generation of the calibrated image frame) and the process proceeds to block 440. At block 440, the dimensioner 308 is configured to receive the calibrated image frame from the calibrator 304 and determine whether an expected dimensioning error resulting from the temperature of the imaging assemblies 116 exceeds a threshold. The dimensioner 308, in some examples, performs the determination at block 440 by comparing the embedded temperature to one or more temperature thresholds stored by the dimensioner 308. In other examples, the dimensioner retrieves the subset of the parameters 232 corresponding to the temperature interval matching the embedded temperature measurement, and compares the dimensioning error parameter (e.g., a percentage deviation of the distance D, as noted above) to one or more thresholds.

The dimensioner 308, upon determining that the expected error level exceeds a threshold, proceeds to block 445. At block 445, the dimensioner 308 is configured to apply one or more restrictions to the dimensioning process to be applied to the calibrated image frame. Examples of the error thresholds and corresponding dimensioning restrictions are shown below in Table 2.

TABLE 2

Example Error Thresholds and Restrictions

| Dimension Error Threshold | Temperature Threshold | Restriction |
| --- | --- | --- |
| E < 1% | T < 40° C. | None |
| 1% < E < 2% | 40° C. < T < 60° C. | $H_{min}$, $W_{min}$, $L_{min}$ |
| E > 5% | T > 60° C. | Abort dimensioning |

As seen above, Table 2 includes both dimension error thresholds and temperature thresholds. In some examples, either the dimension error thresholds or the temperature thresholds may be omitted. As also seen in Table 2, the restrictions applied at block 445 vary with the dimension error thresholds and/or temperature thresholds. For example at a temperature below 40 degrees C., no restriction is applied (indeed, the thresholds shown in the first row of Table 2 may simply be omitted in some examples, with the result that the determination at block 440 is negative and block 445 is bypassed). At a temperature between 40 and 60 degrees C., dimensioning is permitted, but is restricted to objects with minimum dimensions. In other words, the dimensioner 308 proceeds to block 450 via block 445 and determines dimensions for the object 120, but aborts the dimensioning process if the dimensions determined at block 450 fall below the minimums specified in the restrictions. Further, at a temperature above 60 degrees C., the dimensioner 308 is configured, in the present example, to abort the dimensioning process. Accordingly, the dimensioner 308 is configured to present, e.g. on the display 224 of the handheld module 102, a message stating that the elevated temperature prevents sufficiently accurate dimensioning.

Variations to the above methods and apparatus are contemplated. In some examples, a plurality of sets of parameters 232 are stored in the memory 204 and accessed by the frame generator 300, the calibrator 304 and the dimensioner 308. Each set of parameters 232 may correspond, for example, to an individual image sensor. Thus, the device 100 may store two sets of parameters 232, one for each image sensor in the image assemblies 116. In another embodiment, frames having corresponding embedded temperature readings above a predetermined threshold (e.g., above 60 C in Table 2 above), are discarded, in which case the method moves on to process any subsequent frames. In such embodiments, in other words, the performance of block 440 may be implemented following block 410. For example, the frame generator 300 can be configured, when the temperature reading is above the predetermined threshold, to discard the corresponding raw image frame and return to block 405 without performing the remainder of the method 400.

In further examples, at least a portion of the blocks of the method 400 are performed at the handheld module 102 rather than the dimensioning module 108. For example, blocks 435 to 450 can be performed by the processor 216 rather than the processor 200 in some examples. In further examples, the parameters 232 are stored in the memory 220 rather than the memory 204, and the components of the application 228 are configured to retrieve the parameters 232 as described above via the communications interfaces 208 and 212.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A data capture device, comprising:
an imaging module including an image sensor and a lens;
a temperature sensor associated with the imaging module;
a memory storing, for a plurality of temperatures, respective imaging module response parameters corresponding to the temperatures;
an imaging controller connected to the image sensor and the temperature sensor, the imaging controller including a frame generator configured to:
receive (i) image data from the image sensor and (ii) a temperature measurement from the temperature sensor;
generate a raw image frame containing the temperature measurement and the image data; and
provide the raw image frame to a calibrator configured to generate a calibrated image frame based on the raw image frame and one of the imaging module response parameters corresponding to the temperature matching the temperature measurement,
wherein the imaging controller is configured to:
retrieve a dimensioning error value from the parameters corresponding to the temperature measurement,
compare the dimensioning error value to a threshold,
when the dimensioning error value does not exceed the threshold, determine object dimensions from the calibrated image frame, and
when the dimensioning error value exceeds the threshold, apply a restriction to executing of the determination of object dimensions.

2. The data capture device of claim 1, wherein the imaging module response parameters each correspond to one of a plurality of predetermined temperature ranges.

3. The data capture device of claim 1, the frame generator further configured to retrieve one of the imaging module response parameters corresponding to the temperature measurement from the memory for provision to the calibrator with the raw image frame.

4. The data capture device of claim 1, the imaging module response parameters including at least one of sharpness, signal-to-noise ratio, dynamic range, exposure, lens vignetting, contrast, distortion, analog gain, digital gain, and exposure time.

5. The data capture device of claim 1, wherein the temperature measurement is contained in a header portion of the raw image frame.

6. The data capture device of claim 1, the frame generator further configured to:
receive further image data from the image sensor;
determine whether to generate a further raw image frame containing a further temperature measurement;
when the determination is affirmative, generate the further raw image frame containing the further image data and a further temperature measurement; and
when the determination is negative, generate the further raw image frame containing the further image data without a further temperature measurement.

7. The data capture device of claim 6, the frame generator configured to perform the determination based on an elapsed time period between generation of a previous raw image frame containing a previous temperature measurement and the receipt of the further image data.

8. The data capture device of claim 1, the imaging module comprising:
a first imaging assembly including the image sensor and the lens;
a second imaging assembly including a second image sensor and a second lens;
the temperature sensor associated with the first imaging assembly;
a second temperature sensor associated with the second imaging assembly; and
a housing supporting the first imaging assembly, the second imaging assembly, the temperature sensor and the second temperature sensor.

9. The data capture device of claim 8, the frame generator further configured to:
receive (i) image data from each of the image sensor and the second image sensor, and (ii) temperature measurements from each of the temperature sensor and the second temperature sensor;
generate a first raw image frame containing the image data received from the image sensor, and the temperature measurement from the temperature sensor;
generate a second raw image frame containing the image data received from the second image sensor, and the temperature measurement from the second temperature sensor; and
provide the first and second raw image frames to the calibrator.

10. The data capture device of claim 9, wherein the imaging module response parameter includes an error parameter indicating a temperature-associated deviation of a distance between the first and second imaging assemblies.

11. A mobile dimensioning device, comprising:
a stereo image assembly having a first imaging assembly including a first image sensor and a first lens, and a second imaging assembly having a second image sensor and a second lens;
a temperature sensor associated with at least one of the first and second imaging assemblies;
a memory storing, for a plurality of temperatures, respective imaging module response parameters corresponding to the temperatures;

an imaging controller connected to the image sensor and the temperature sensor;

the imaging controller including a frame generator configured to:

receive (i) image data from each of the first and second image sensors and (ii) a temperature measurement from the temperature sensor;

generate first and second image frames containing the image data from, respectively, the first and second image sensors; at least one of the first and second image frames containing the temperature measurement; and wherein the imaging controller is configured to:

retrieve a dimensioning error value from the parameters corresponding to the temperature measurement, compare the dimensioning error value to a threshold, when the dimensioning error value does not exceed the threshold, provide the first and second image frames to a dimensioner to determine object dimensions based on the image frames and one of the imaging module response parameters corresponding to a temperature matching the temperature measurement, and when the dimensioning error value exceeds the threshold, apply a restriction to executing of the determination of object dimensions.

12. The mobile dimensioning device of claim 11, wherein the dimensioning error value indicates a temperature-associated deviation of a distance between the first and second image sensors.

13. A method for a mobile dimensioning device comprising:

receiving at an imaging controller of the mobile dimensioning device: (i) image data from each of a first and second image sensors of the mobile dimensioning device, and (ii) a temperature measurement from a temperature sensor associated with at least one of the first and second image sensors;

generating, by the imaging controller of the mobile dimensioning device, first and second image frames containing the image data from, respectively, the first and second image sensors, at least one of the first and second image frames containing the temperature measurement from the temperature sensor; and retrieving a dimensioning error value from the parameters corresponding to the temperature measurement;

comparing the dimensioning error value to a threshold;

when the dimensioning error value does not exceed the threshold, determining object dimensions based on the image frames and an imaging module response parameter corresponding to a temperature matching the temperature measurement, and when the dimensioning error value exceeds the threshold, applying a restriction to the determination of object dimensions.

14. The method of claim 13, wherein the dimensioning error value indicates a temperature-associated deviation of a distance between the first and second image sensors.

* * * * *